United States Patent
Hardee et al.

(10) Patent No.: US 10,110,729 B1
(45) Date of Patent: Oct. 23, 2018

(54) METHODS AND SYSTEMS FOR MANAGING MOBILE DEVICES WITH FLOCK PARTICIPATION

(71) Applicant: INTERNATIONAL BUSINESS MACHINES CORPORATION, Armonk, NY (US)

(72) Inventors: Christopher J. Hardee, Raleigh, NC (US); Steven R. Joroff, River Vale, NJ (US); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/479,405

(22) Filed: Apr. 5, 2017

(51) Int. Cl.
*H04W 4/08* (2009.01)
*H04M 1/725* (2006.01)
*H04W 4/021* (2018.01)

(52) U.S. Cl.
CPC ....... *H04M 1/72572* (2013.01); *H04W 4/021* (2013.01); *H04W 4/08* (2013.01)

(58) Field of Classification Search
CPC .... H04M 1/72572; H04W 4/021; H04W 4/08
See application file for complete search history.

(56) References Cited

U.S. PATENT DOCUMENTS

| 8,116,748 | B2 | 2/2012 | Aaron |
| 8,560,369 | B2 | 10/2013 | Messer |
| 9,055,390 | B2 | 6/2015 | Lor et al. |
| 9,142,114 | B2 | 9/2015 | Ramachandran |
| 9,293,041 | B2 | 3/2016 | Cama et al. |
| 9,369,847 | B2 | 6/2016 | Borghei |
| 9,378,223 | B2 | 6/2016 | Choudhury et al. |
| 2008/0146205 | A1* | 6/2008 | Aaron ................ H04M 3/4228 455/414.2 |
| 2009/0132307 | A1 | 5/2009 | Messer |
| 2012/0221639 | A1* | 8/2012 | Mallet .................. G06Q 50/01 709/204 |
| 2014/0162698 | A1 | 6/2014 | Han |
| 2015/0373509 | A1 | 12/2015 | Wang et al. |
| 2016/0044457 | A1 | 2/2016 | Marti et al. |
| 2016/0073318 | A1 | 3/2016 | Aguirre |

OTHER PUBLICATIONS

Dang, "Stable flocking of mobile agents in mixed absolute and relative navigations context with communication," Proceedings of the 10th World Congress on Intelligent Control and Automation, Jul. 6-8, 2012 (7 pages).

(Continued)

*Primary Examiner* — Chuong A Ngo
(74) *Attorney, Agent, or Firm* — Griffiths & Seaton PLLC

(57) ABSTRACT

Embodiments for managing mobile devices by one or more processors are described. A plurality of mobile devices are detected within a predetermined distance of each other for at least a predetermined duration. After the plurality of mobile devices are detected, the functionality of at least one of the plurality of mobile devices is altered based on data associated with another of the plurality of mobile devices.

18 Claims, 11 Drawing Sheets

(56) References Cited

OTHER PUBLICATIONS

Chung et al., "An Unobtrusive Interaction Interface for Multiple Co-located Mobile Devices," 2015 IEEE 11th International Conference on Wireless and Mobile Computing, Networking and Communications (WiMob), 2015 (8 pages).

Khodayari et al., "Flocking Control with Single-COM for Tracking a Moving Target in Mobile Sensor Network Using Gravitational Search Algorithm," 1st Conference on Swarm Intelligence and Evolutionary Computation (CSIEC2016), Higher Education Complex of Bam, Iran, 2016 (6 pages).

\* cited by examiner

METHODS AND SYSTEMS FOR MANAGING MOBILE DEVICES WITH FLOCK PARTICIPATION

BACKGROUND OF THE INVENTION

Field of the Invention

The present invention relates in general to computing systems, and more particularly, to various embodiments for managing mobile devices.

Description of the Related Art

In recent years, mobile electronic devices (or mobile devices), such as cellular/mobile/smart phones, personal digital assistants (PDAs), and tablets, have become widely used to the point that many people now have such a device with them at all times. These devices are able to assist users is a multitude of ways in their daily lives, such as with respect to communication, internet access, scheduling, and entertainment.

However, mobile devices (and/or the applications utilized by mobile applications) typically operate at the behest of a single user. That is, current mobile devices do have the ability to leverage or utilize, for example, the instructions, characteristics, and data associated with other mobile devices that may be in close proximity, and perhaps traveling in the same general direction.

SUMMARY OF THE INVENTION

Various embodiments for managing mobile devices by one or more processors are described. In one embodiment, by way of example only, a method for managing mobile devices, again by one or more processors, is provided. A plurality of mobile devices are detected within a predetermined distance of each other for at least a predetermined duration. After the plurality of mobile devices are detected, the functionality of at least one of the plurality of mobile devices is altered based on data associated with another of the plurality of mobile devices.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
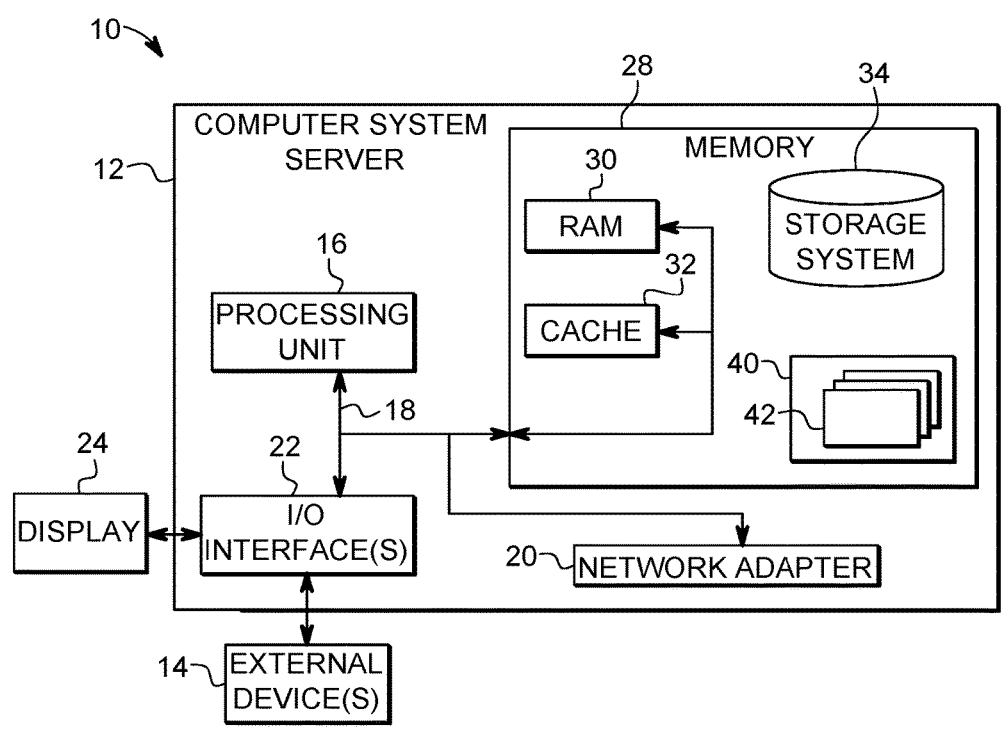
FIG. 1 is a block diagram depicting an exemplary computing node according to an embodiment of the present invention.

As previously indicated, mobile devices and/or applications typically operate at the behest of a single user, as opposed to in the context of a system (or group) of users. In certain situations, operating mobile devices (and/or applications) in such a way as to utilize the instructions, characteristics, data, etc. associated with other mobile devices in relatively close proximity may be beneficial and improve the functionality, flexibility, and overall usefulness of the devices.

In view of the foregoing, a need exists for methods and systems that allow mobile devices within a group, or a "mobile flock" or "flock," as described in greater detail below, to collaborate in such a way to enhance the overall experience of the users in the group.

To address these needs, the methods and systems of the present invention, for example, detect (or identify or define) mobile devices (and/or the users associated with the devices) within a mobile flock and alter the functionality of the mobile devices based on instructions, characteristics, data, etc. associated with other devices in the mobile flock.

For example, in some embodiments, if mobile devices are determined (or detected) to be traveling with the same general velocity and direction within a predetermined range for a predetermined about of time, one or more aspects of the functionality of the devices (e.g., with respect to operating systems implemented by the devices and/or particular applications or application provisions on the devices) is altered to increase the overall usefulness of the devices by leveraging the "awareness" of the other devices in the flock. In some embodiments, device (or application) capabilities may be modified, enhanced, and/or limited as a result of being associated with (or participating in) a flock. For the purposes of this description, this altered functionality may be referred to as, for example, "flock functionality," "flock participation," or "flock capability."

The devices deemed to be part of the flock may be updated dynamically and/or in real-time. For example, in some embodiments, the mobile flock(s) may merge, split, add members, lose members, dissipate completely, etc. In some examples, flocks are formed by mobile devices that are not moving (e.g., the devices relatively stationary but may be remaining within a predetermined range for a predetermined amount of time).

Before utilizing the flock functionality, the members of the flock may be associated with one another in various ways, such as through social media. However, in some embodiments, the members may not be (previously) associated in any way (e.g., other than the capability of the respective devices to perform/take part in the flock functionalities/capabilities described herein).

In some embodiments, a method for managing mobile devices by one or more processors is provided. A plurality of mobile devices are detected within a predetermined distance of each other for at least a predetermined duration. After the plurality of mobile devices are detected, the functionality of at least one of the plurality of mobile devices is altered based on data associated with another of the plurality of mobile devices.

As one example, in some embodiments, a method, again by one or more processors, is provided for altering the functionality of one or more mobile devices (and/or software applications thereon). A plurality of mobile devices are detected within a predetermined proximity, traveling with the same general speed and direction, for a defined period of time. The detected mobile devices are grouped into a uniquely identifiable mobile flock with at least one associated attribute. The mobile flock (or the "state" thereof) is maintained as long as it does not become undetectable for more than a determined period of time (e.g., the flock is maintained as long as the mobile devices remain within the predetermined proximity).

In some embodiments, the mobile devices within the flock (and/or the users thereof) are then provided with an indication that one or more device/application functionality alterations is possible based on the presence (or detection) of the mobile flock. The user(s) may then select whether or not they wish to utilize the altered functionality provided by the flock (e.g., via a pop-up window, voice command, etc.). However, in some embodiments, the altered/flock functionality may be selected as a system (or application) default/setting before the flock is detected/formed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, mobile devices such as mobile (or cellular and/or smart) phones, PDAs, tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
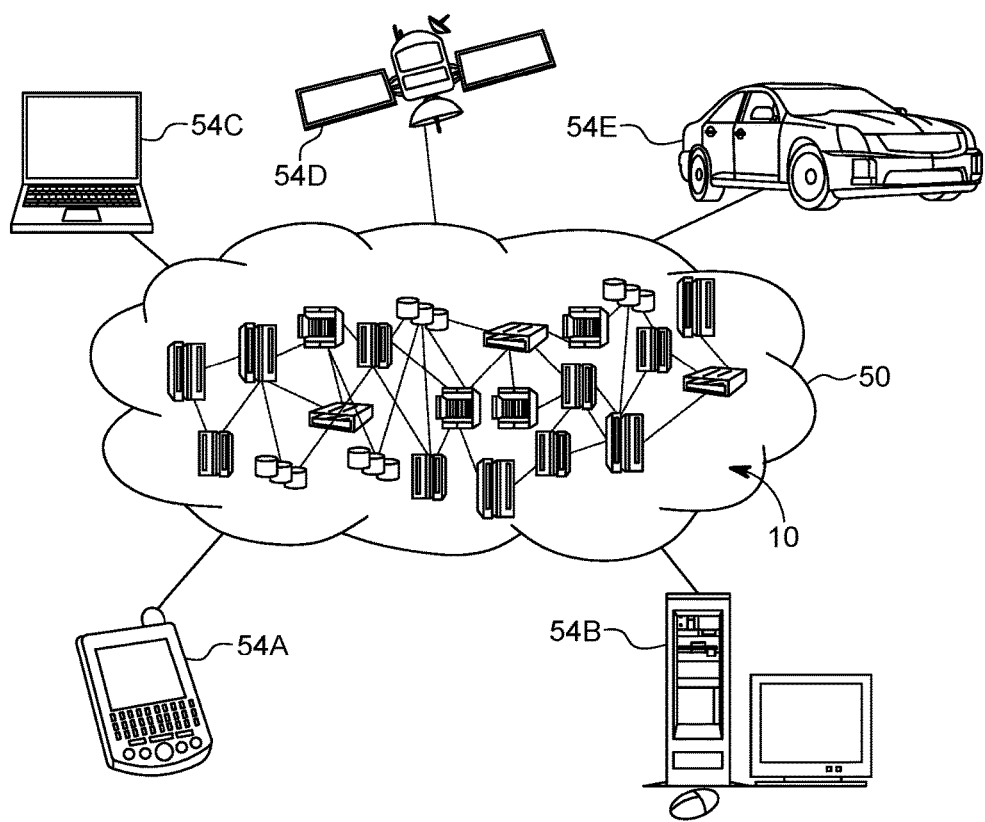
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, satellites (e.g., GPS satellites) 54D, and vehicles (e.g., automobiles, aircraft, watercraft, etc.) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
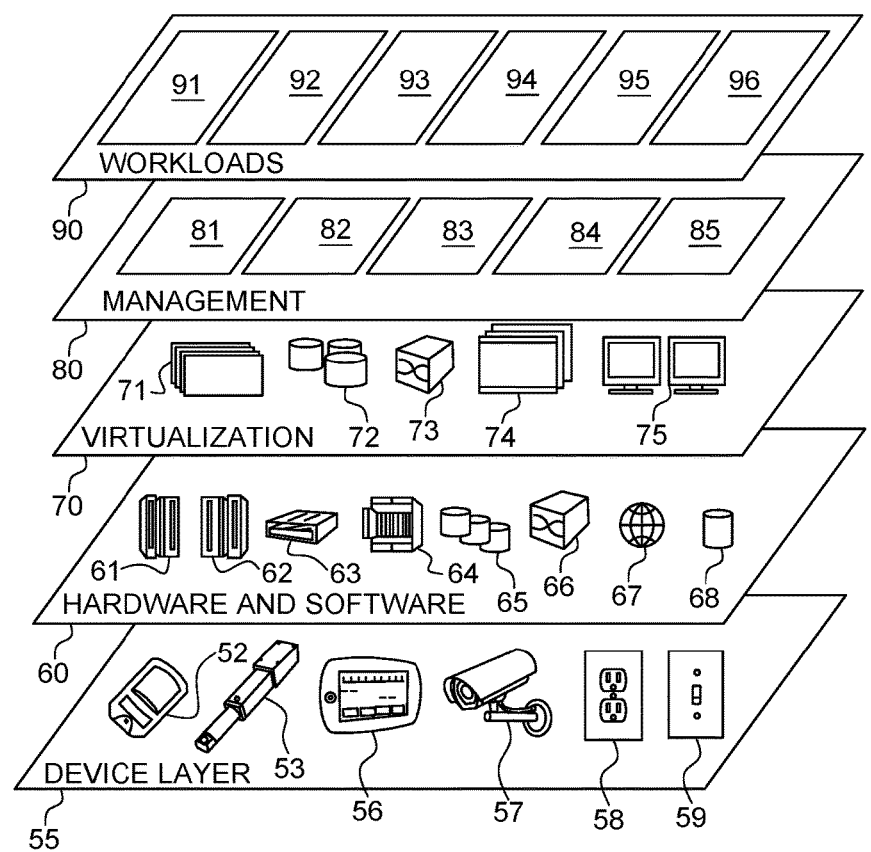
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to mobile devices, computing systems within vehicles (e.g., automobiles, aircraft, watercraft, etc.), and satellites (e.g., GPS satellites), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing mobile devices as described herein. One of ordinary skill in the art will appreciate that the workloads and functions 96 for managing mobile devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing mobile devices. A plurality of mobile devices are detected within a predetermined distance of each other for at least a predetermined duration. After the plurality of mobile devices are detected, the functionality of at least one of the plurality of mobile devices is altered based on data associated with another of the plurality of mobile devices.

In some embodiments, an indication of a selection to have the altering performed is received before the altering of the functionality of the at least one plurality of mobile devices. The indication of the selection may be received before the mobile devices are detected (e.g., via a system/default setting on the mobile device(s)).

In some embodiments, the plurality of mobile devices are in motion at least during the detecting of the plurality of mobile devices. The motion of each of the plurality of mobile devices may be substantially the same direction as the motion of the others of the plurality of mobile devices.

In some examples, the data associated with the other of the plurality of mobile devices is input into the other of the plurality of mobile devices through a user interface of the other of the plurality of mobile devices. However, the data associated with the other of the plurality of mobile devices includes information associated with a user of the other of the plurality of mobile devices. The altering of the functionality of the mobile devices may include altering the functionality with respect to at least one of an operating system or a software application (or software application provision).

Figure 4:
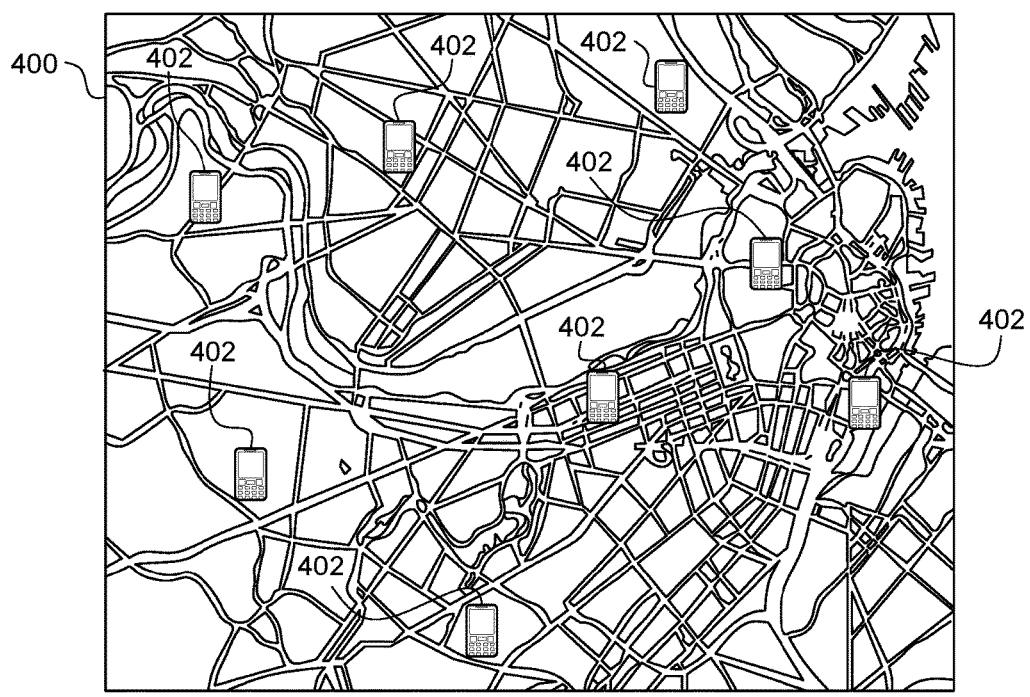
FIG. 4 is a plan view of a map of a region, showing the locations of various mobile devices.

Referring to FIG. 4, a map 400 of an exemplary region is shown. In the depicted embodiment, the region includes various roadways and other features that indicate the region is relatively large (e.g., miles across). However, it should be understood that in other embodiments, the region may be considerably smaller (e.g., dozens of feet or yards across) and may correspond to a particular location, such as an airport, train station, shopping center, retail location, etc. It should also be understood that the map 400 may be displayed on an electronic device, such as a cellular phone, PDA, tablet, or computer system in a vehicle, such as an automobile. However, the map 400 may also be used simply to illustrate aspects of functionality in accordance with some embodiments described herein.

On the map 400, the locations of various mobile devices (e.g., mobile phones, PDAs, laptops, etc.) 402 are shown. As shown in FIG. 4, the mobile devices 402 are spaced in a relatively random pattern across the map 400 and spaced with relatively large distances (e.g., hundreds of yards, several miles, etc.) between them. Although not shown in FIG. 4, at least some of the mobile devices 402 may be in motion (e.g., traveling) across the region in various directions. In some embodiments, such a distribution of mobile devices 402 does not cause a mobile flock, as described herein, to be formed. Rather, the mobile devices 402 may simply function as normal, such as at the behest of the individual users thereof.

Figure 5:
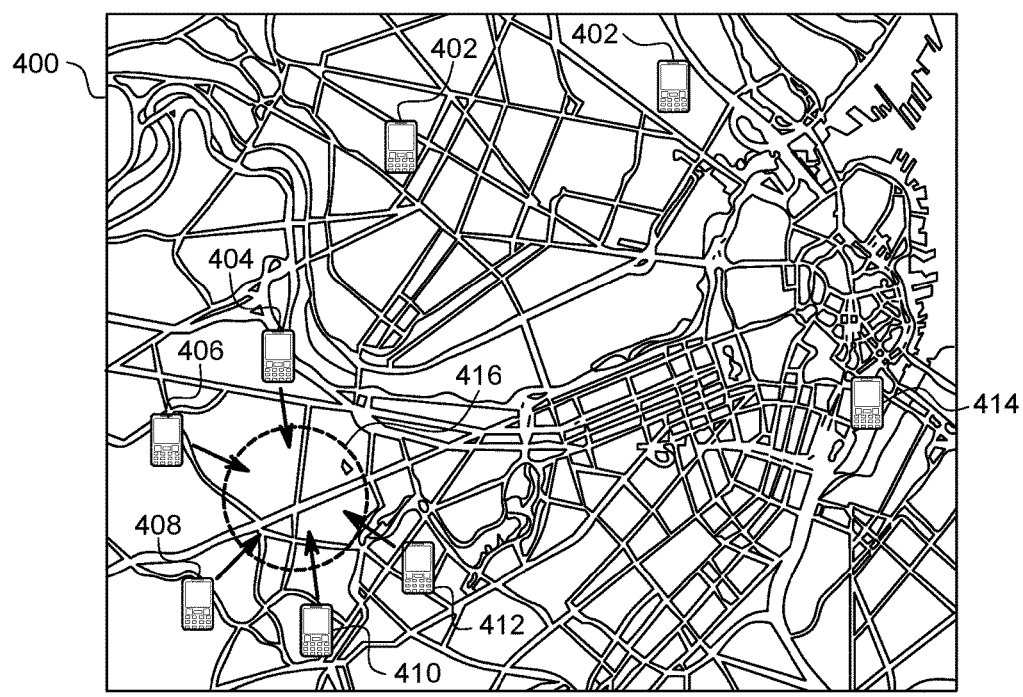
FIGS. 5-10 are plan views of the map of FIG. 4, illustrating the locations and movements of mobile devices in accordance with various aspects of the present invention.
Figure 6:
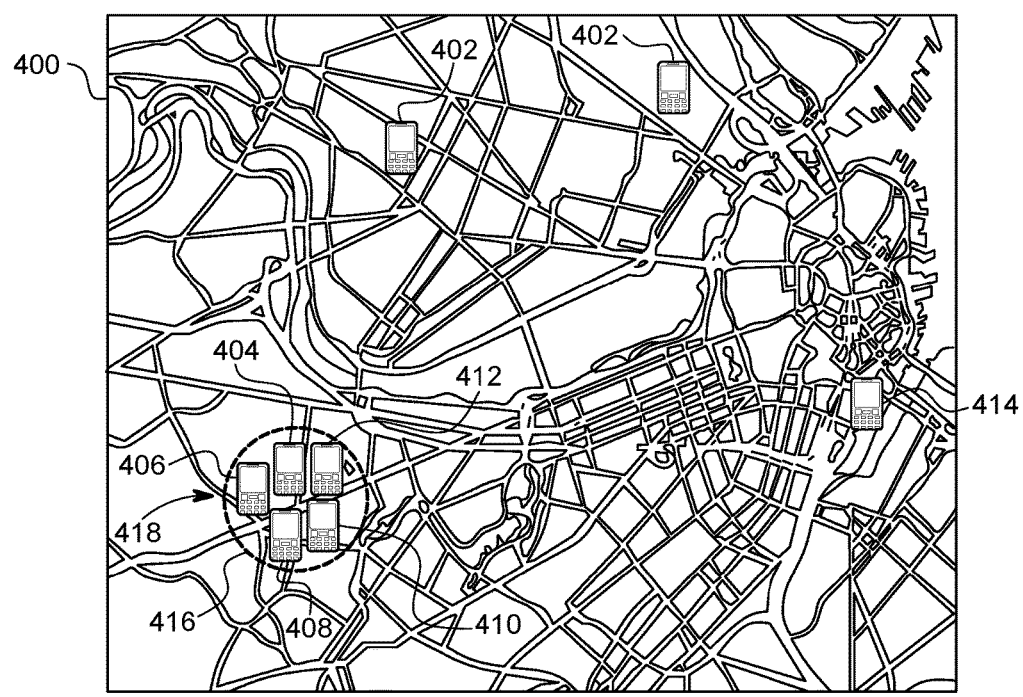

Referring now to FIG. 5, the map 400 is again shown, now with some of the mobile devices particularly indicated as 404, 406, 408, 410, 412, and 414. In contrast to FIG. 4, mobile devices 404-412 are moving towards one another, into an area (or range) 416, while mobile device 414 remains relatively isolated. As shown in FIG. 6, mobile devices 404-412 have collected within area (or range) 416. In some embodiments, the range 416 corresponds to each of mobile devices 404-412 being within a predetermined distance of each other, which may be referred to as "mobile flock range." This distance may be any suitable distance depending on the exact conditions (e.g., 20 ft, 100 ft, etc.). In some embodiments, after mobile devices 404-412 remain within range 416 for a predetermined amount of time (e.g., 30 s, 1 min, etc.), those mobile devices 404-412 are deemed (or detected) as (at least potentially) forming a mobile flock 418.

In some embodiments, the mobile flock 418 may be formed while mobile devices 404-412 are (relatively) stationary (i.e., mobile devices 404-412 are not necessarily moving, let alone moving in the same general direction), such as shown in FIG. 6. However, in some embodiments, the mobile flock 418 is only formed if mobile devices 404-412 are detected as moving in substantially the same direction at substantially the same speed (i.e., the flock 418 is moving as a whole, while devices 404-412 remain within range 416). Regardless of whether or not the individual devices 404-412 are moving when the flock 418 is formed, it should be noted that in at least some embodiments, the flock 418 is formed (only) by the proximity of the devices 404-412 to each other, as opposed to, for example, the proximity of the devices 404-412 to any other infrastructure, such as buildings, wireless networks, etc.

Figure 7:
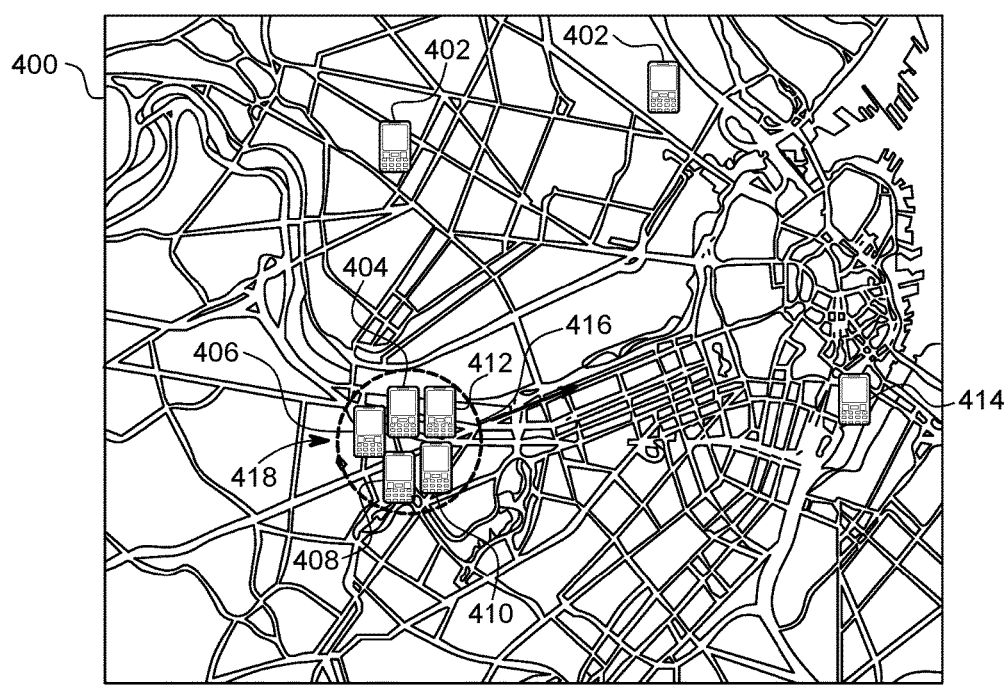

In the example shown in FIG. 7, the mobile flock 418 is moving (e.g., in an east by northeast direction). More particularly, each of the mobile devices 404-412 is moving in a direction (e.g., north by northeast) that is substantially the same as the other devices within the flock 418. Again, it should be noted that in at least some embodiments, the mobile flock 418 may be formed without any movement from the mobile devices 404-412, and after the flock 418 is formed, the flock functionality described below may continue so long as the individual devices 404-412 remain within range 416 of each other.

Figure 8:
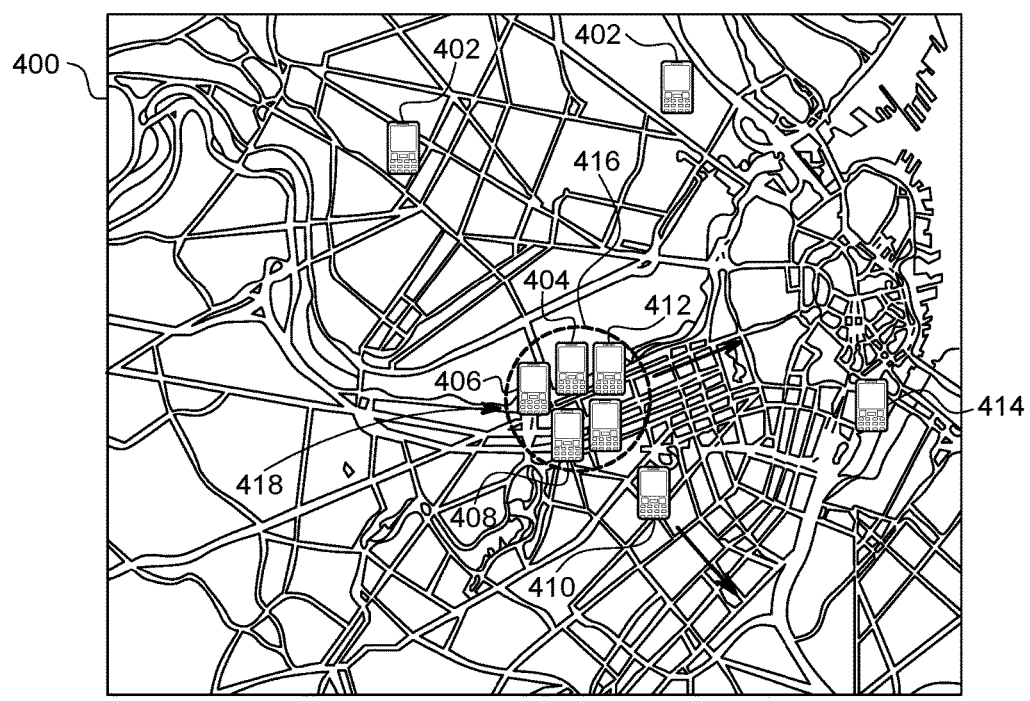

As such, in some embodiments, individual devices may be detected as leaving (and/or no longer being part of) the flock. For example, referring now to FIG. 8, mobile device 410 is shown as moving in a direction different than the other devices within the flock 418. In the particular example shown, mobile device 410 is moving in a substantially southeast direction, while the other devices within the flock 418 continue to move in the north by northeast direction shown. As such, mobile device 410 leaves range 416, while the other devices 404, 406, 408, and 412 remain within range 416. If mobile device 410 remains outside of the range 416 for a predetermined amount of time (e.g., 30 s), it may be determined to have left the flock 418, while devices 404, 406, 408, and 412 remain within (or part of) the flock 418. However, in some embodiments, if a mobile device(s) is detected to have left the flock for a relatively short duration (e.g., less than the predetermined threshold) before returning to the flock (or the range), such devices may retain flock functionality. Similarly, in some embodiments, if a mobile device is determined to have left the flock, the device may return to the flock by moving back into range 416 and remaining there for the appropriate amount of time.

Figure 9:
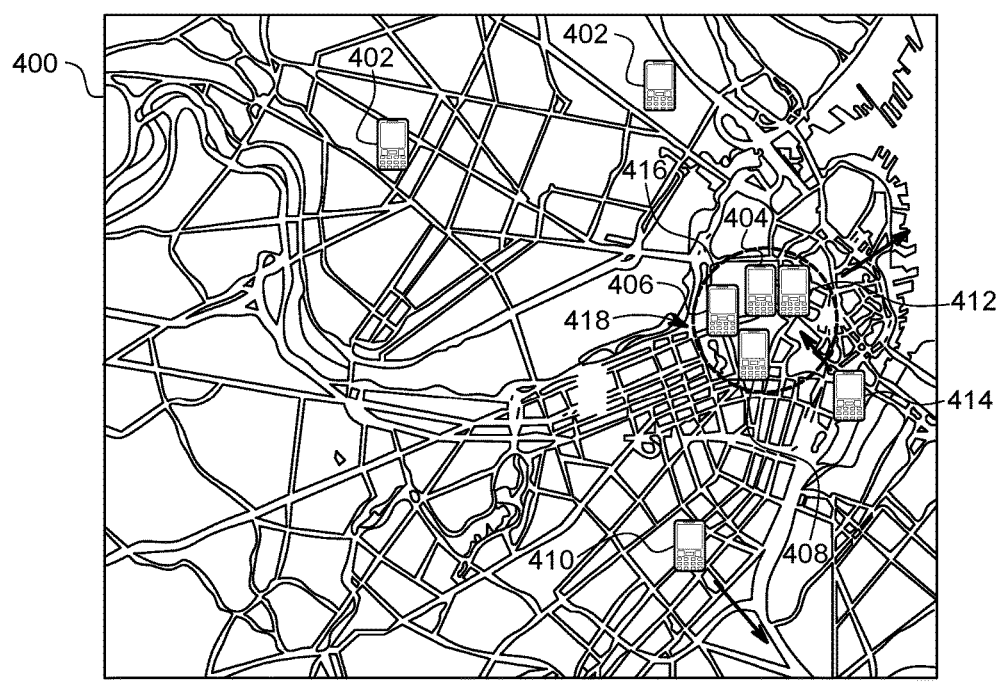
Figure 10:
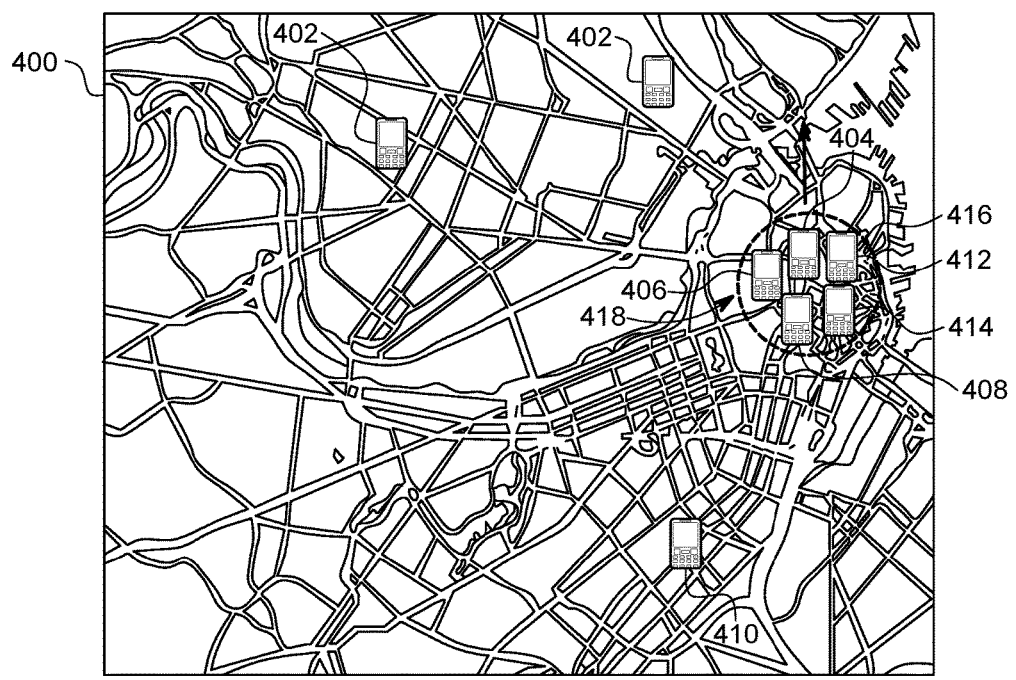

As shown in FIG. 9, as the mobile flock 418 continues to move, mobile device 414 moves into range 416. If mobile device 414 remains within range 416 for an appropriate amount of time, mobile device 414 is determined to have joined the flock 418, and may partake in the flock functionality. FIG. 10 illustrates the flock 418 after mobile device 414 has joined. It should be noted that in FIG. 10, the flock 418 has changed its direction of movement (e.g., substantially north), and the individual mobile devices 404, 406, 408, 412, and 414 therein are all within range 416 (i.e., devices 404, 406, 408, 412, and 414 may continue to participate in the flock).

As such, it should be understood that after a flock has been formed, mobile devices within the flock may leave the flock and/or additional mobile devices may join the flock. Similarly, although not specifically shown, mobile flocks may be determined to split into multiple flocks, join with other flocks, and/or dissipate completely, depending on, for example, the movements of the individual mobile devices.

In at least some embodiments, before flock/shared functionality is utilized by the mobile device(s), an indication of a selection to take part (or activate) flock functionality is received (e.g., from the user(s) of the device(s)). For example, in some embodiments, after a mobile flock is detected, a message may be displayed on the mobile device (s), alerting the user(s) that flock functionality is possible (and/or that a mobile flock has been detected). In such an example, in order for flock functionality to be utilized by the respective device, the user may have to respond in such a way that indicates that he/she wishes to take part in the mobile flock (e.g., via a touch/text response, voice command, etc.). In other embodiments, the mobile device may include the selection of whether or not to take part in mobile flocks as a setting or preference (e.g., within the system preferences of the mobile device and/or of particular applications on the mobile device). In such an example, the selection to take part in mobile flocks may be received before or after a mobile flock is detected.

When a mobile flock has been detected (and in some embodiments, an indication of a selection to take part in the mobile flock has been received from the user), the functionality of the mobile devices (e.g., with respect to operating systems and/or applications thereon) is altered. In some embodiments, the functionality devices (or applications) are altered based, at least in part, on data associated with other devices (and/or users) within the flock. In some examples, the data may correspond to actions taken by the users of the other mobile devices (e.g., data input into the mobile devices through a user interface). However, in some examples, the data may include information associated with the user of the mobile device (e.g., social media information, tastes/preferences regarding entertainment, food, etc., an itinerary or schedule, etc.).

As one example of the flock functionality described herein, consider a group of users that are linked through social media and traveling together (e.g., riding in a vehicle, walking down a street, etc.). One possible implementation is that a mobile restaurant reservation and/or recommendation application (e.g., rendered on each mobile device in the flock) may automatically choose the party size (e.g., based on the number of users/devices in the flock) and recommend restaurants based on, for example, the tastes of the users within the flock (e.g., as indicated in a user profile, on social media, etc.), as well as the location of the flock. After providing the list of potential restaurants to the users within the flock, the application may provide a voting feature in which the users are allowed to indicate their choice of restaurant.

As another example, using the same group (or flock) described above, a mobile navigational guidance application may synchronize and display the itinerary of each of the members of the flock that is shared with each of the users. If the application utilizes a map, the appropriate flock members could be indicated in a manner different than that of the other members (e.g., highlighting, different color, etc.).

Continuing with the exemplary flock described above, a mobile music streaming application may synchronize and display the current streaming playlist from one device on the other devices within the flock, and perhaps allow the other flock members to add songs to the playlist. In the special flock mode of such an application, one user (or device) may be designated to be the sink to which the music is actually streamed, while the other users operate in a limited mode in which they may only search and add songs to the playlist. A voting feature may also be implemented in which a set of candidate songs are proposed from the pool of added songs and then the flock participants vote for their preference.

The flock functionality may also be utilized in mobile multi-player game applications. For example, game participants may be selected directly from the flock without having to search for contenders online (or perhaps an internet connection is not feasible and therefore only mobile devices within short range are possible).

As another example, mobile payment applications may also be used. For instance, while a user is paying the bill at a restaurant using, for example, his/her mobile device, the bill may be split amongst various members of the flock. In such an example, the other members of the flock may be provided with an "opt-in," and once all agree, payment is collected and released to the restaurant.

Mobile flocks may also be formed with users/devices that were not previously associated with each other (e.g., not linked through social media). For example, a ridesharing application may detect potential flock members at an airport at the same time and recognize a common destination from the airport (e.g., a particular hotel or different hotels within the same vicinity). The flock members may be provided with an indication of the potential ridesharing and a manner in which to accept the option (e.g., via touch response, voice command, etc.), along with specific instructions on how to take part in the ridesharing. For example, the flock members that are going to take part in the ride sharing may receive a specific meeting time and place and/or the exact location(s) of the other members of the flock (if permissible/allowed based on user preference). In some embodiments, in instances in which the ridesharing involves multiple destinations/drop offs, the flock members may be provided with a recommended drop off sequence (e.g., optimized to save time, costs, etc.). In instances in which the flock members take different vehicles to their destinations, the originally formed flock may be split into smaller flocks (e.g., of the members in each vehicle) and/or merge with new members to form larger flocks (e.g., a relatively large vehicle, such as a van).

In some embodiments, features of the mobile devices may be restricted or enhanced when taking part in a mobile flock. For example, if certain users indicate (e.g., via system and/or application settings) a strong preference to not have any photographs or audio recordings of them taken while taking part in a flock, all of the mobile devices within the flock may have the appropriate features disabled. In such instances, the other members of the flock may indicate a strong preference to not have such features disabled, which may result in the certain users not taking part in the flock and/or the flock not being formed.

When utilizing the flock functionality, the mobile devices (and/or certain applications) may provide alerts or indications to users in various situations. For example, after a mobile flock has been formed, the mobile device(s) may generate an audio/aural alert (e.g., a warning tone) or visual message when it is determined that the particular mobile device is "falling behind" (i.e., the distance between that mobile device and the other mobile devices within the flock is increasing and/or has reached a predetermined threshold). Similarly, such a notification/alert may be generated by all of the mobile devices within the flock to indicate, for example, that one or more of the flock has been left behind.

As a specific example utilizing multiple aspects of the flock functionality described herein, consider a scenario in which a family of four is on vacation, driving in a vehicle (e.g., cross country). Each user (or member of the family) has a mobile device (e.g., a smart phone or a computing system built-in to the vehicle) which is turned on (or activated), set to take part in flock functionality (i.e., "flock mode" is enabled), and has applications in common with the devices of the other family members (i.e., the other flock members). One member of the family (e.g., the driver) may enter an itinerary into his/her device (e.g., via voice commands), which is shared with/sent to the other devices within the flock so that the other family members may view it (e.g., using a map displayed on the devices/via a particular application). At some point during the trip, one of the family members (e.g., a child) desires to stop to get something to eat and initiates a restaurant finding/review application on his/her device. When the new application is launched, the other members of the flock may be notified and provided with an option to open the same (or similar) application and take part via flock functionality. Various restaurants may be recommended (e.g., automatically) to all of the participating members of the flock based on, for example, the tastes of the individual family members (e.g., found in user profiles), as well as the locations of the restaurants (e.g., the distance between the restaurants and the current location of the flock/vehicle). A voting feature may be initiated that allows each member to cast a vote for their choice of restaurant (e.g., via touch or voice commands). After the restaurant is chosen, an updated itinerary may be created, indicating the newly scheduled stop at that particular restaurant.

Continuing with the same exemplary flock, one of the family members may initiate a multi-player game application (e.g., a word game). If his/her mobile device has no internet access, the game application may indicate the possibility of playing the game in flock mode (e.g., via a wireless network) with the other members of the detected flock (i.e., the other members of the family). Other devices within the flock may have the same game application installed on their devices, which alerts the users and provides an option of launching the application and joining in the game. It should be noted that in at least some embodiments described herein, not all members of the flock have to take part in all aspects of flock functionality for the other members of the flock to do so. As such, only two or three members of the family may participate in the game.

As another example utilizing the family on vacation as an exemplary flock, several of the members of the flock (e.g., children) may use their mobile devices to take photographs of the surrounding area, while flock mode is enabled. After the photos are taken, they may be transferred to a shared gallery (e.g., via an application common to all of the devices in the flock) so that all of the members of the flock may be able to view, rate, and/or comment on the photos, regardless of whether or not that particular device is being used to take the photographs.

In some embodiments, flock formation/participation may be based on additional user preferences, such as the participation in multiple flocks at the same time, formation proximity (e.g., the predetermined distance/range used to detect/determine flock formation, which may differ for mobile devices moving together and stationary mobile devices), and variation factors (e.g., how cohesive the flock needs to be in order for the particular user to take part in the flock). Additionally, as mentioned above, preferences may be set so that users only join flocks with other users with which they are previously associated (e.g., linked via social media, reside in the same city, zip code, etc., attending the same school(s), work for particular companies, etc.).

In some embodiments, particular users/devices may be given unique access levels, permissions, overrides, etc. to the devices of other users in the flock (e.g., based on a previous association or flock participation with that user). Some mobile flocks may be configured in such a way that particular flock members may override the actions of other flock members and/or set rules for participating in the flock (which may result in the flock not being formed, depending on the settings/preferences of the different users). For example, only particular users/devices within the flock may be able to utilize cameras and/or audio recording devices when participating in the flock.

In some embodiments, such as those in which the flock is moving, the speed and/or acceleration of the flock may be used to determine the activity level of the flock and/or the individual users/devices. For example, the flock (and/or the individual users) may be determined to be running/jogging, walking, driving, or flying. In such an instance, the one or more applications may be launched based on the detected activity/state of the flock. As one example, if the members of the flock are determined to be flying on the same aircraft, the destination of the aircraft may be determined (e.g., using an itinerary in a user profile or flight path/plan of the aircraft) and suggested activities at the destination may be presented to the flock members (who may then, for example, vote on the different activities as described above).

Figure 11:
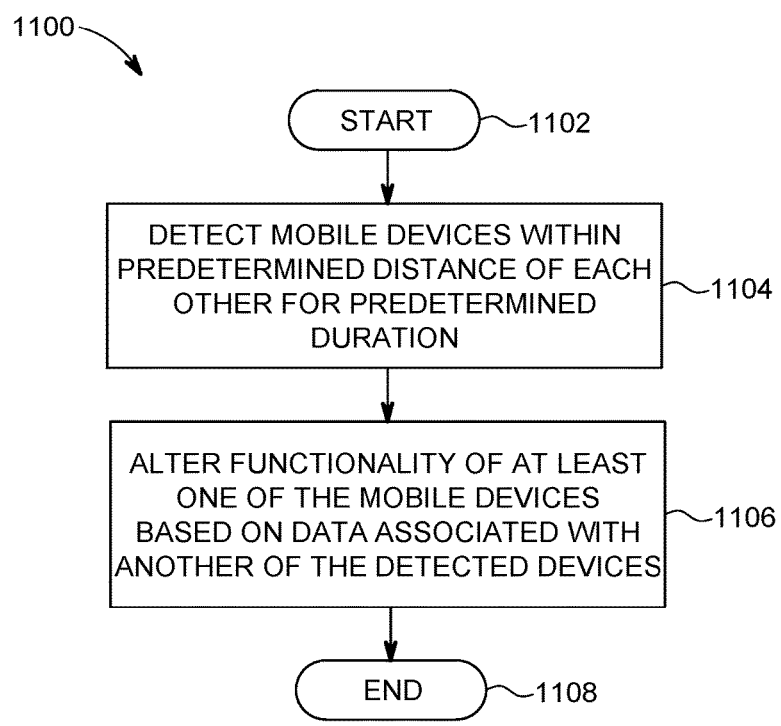
FIG. 11 is a flowchart diagram depicting an exemplary method for managing mobile devices in which various aspects of the present invention may be implemented.

Turning to FIG. 11, a flowchart diagram of an exemplary method 1100 for managing mobile devices, in which aspects of the present invention may be implemented, is illustrated. Method 1100 begins (step 1102) with, for example, a plurality of mobile devices (e.g., smart phones, PDAs, tablets, etc.) being activated and in use within the same general vicinity. In some embodiments, at least some of the mobile devices are configured to allow flock functionality, as described above (e.g., via a preference or setting on the device and/or applications on the device).

The mobile devices, or at least some of the mobile devices, are then detected as being within a predetermined distance (or range) of each other for a predetermined duration (step 1104). As described above, the predetermined distance may be any distance, for example, as little as several feet to as large as hundreds of feet, and the predetermined duration may be any amount of time (e.g., 30 s, 1 min, etc.). In at least some embodiments, the group, or flock, of mobile devices is detected (or determined) by the proximity of the devices to each other, as opposed to (and/or not) the proximity of the devices with any other infrastructure (e.g., wireless networks, buildings, etc.). It should be noted that in some examples, the mobile devices are moving (e.g., all moving in substantially the same direction at about the same speed, as would be the case when all of the mobile devices are in one vehicle). However, in other examples, the mobile devices are relatively stationary.

The functionality of at least one of the mobile devices (i.e., the mobile devices determined to be potential members of a mobile flock) is then altered based on data associated with one or more of the other mobile devices (step 1106). The altering of the functionality of the mobile devices may include altering the functionality with respect to at least one of an operating system or a software application (or software application provision). As described above, the data used to alter the functionality may, for example, be associated with actions taken by the user(s) of the other device(s), such as information input via text/touch or voice commands, data associated with the user (e.g., a user profile, social media data, etc.), or any other suitable examples, such as those described above. In at least some embodiments, after the flock is detected and before the flock functionality is initiated, the user is provided with an option of whether or not to take part in the flock functionality (e.g., in examples in which a system or application setting/preference does not indicate such beforehand).

The method 1100 ends (step 1108) with, for example, the flock functionality being ceased for at least some of the users/devices within the flock because one or more of the devices has moved out of the range appropriate for the flock functionality or any other suitable event, such as the devices being powered off, the respective user(s) indicating that they no longer want to participate in the flock, etc. It should be understood that the flock functionality may continue for some of the mobile devices after others have left the flock. That is, as described above, the mobile flocks described herein may lose members, gain members, split, merge with other mobile flocks, etc., and continue various aspects of flock functionality.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing mobile devices, comprising:
    detecting a plurality of mobile devices within a predetermined distance of each other for at least a predetermined duration; wherein the detecting is performed by each of the plurality of mobile devices within the predetermined distance of each other for at least the predetermined duration; and
    after the detecting of the plurality of mobile devices, altering the functionality of at least one of the plurality of mobile devices based on data associated with another of the plurality of mobile devices; wherein the data associated with the other of the plurality of mobile devices includes data input into the other of the plurality of mobile devices through a user interface of the other of the plurality of mobile devices and information associated with a user of the other of the plurality of mobile devices.

2. The method of claim 1, further including, before the altering of the functionality of the at least one of the plurality of mobile devices, receiving an indication of a selection to have the altering performed.

3. The method of claim 2, wherein the receiving of the indication of the selection to have the altering performed occurs before the detecting of the plurality of mobile devices.

4. The method of claim 1, wherein the plurality of mobile devices are in motion at least during the detecting of the plurality of mobile devices.

5. The method of claim 4, wherein the motion of each of the plurality of mobile devices is in substantially the same direction as the motion of the others of the plurality of mobile devices.

6. The method of claim 1, wherein the altering of the functionality of the at least one of the plurality of mobile devices includes altering the functionality of the at least one of the plurality of mobile devices with respect to at least one of an operating system or a software application provision.

7. A system for managing mobile devices, comprising:
at least one processor that
  detects a plurality of mobile devices within a predetermined distance of each other for at least a predetermined duration; wherein the detecting is performed by each of the plurality of mobile devices within the predetermined distance of each other for at least the predetermined duration; and
  after the detecting of the plurality of mobile devices, alters the functionality of at least one of the plurality of mobile devices based on data associated with another of the plurality of mobile devices; wherein the data associated with the other of the plurality of mobile devices includes data input into the other of the plurality of mobile devices through a user interface of the other of the plurality of mobile devices and information associated with a user of the other of the plurality of mobile devices.

8. The system of claim 7, wherein the at least one processor further, before the altering of the functionality of the at least one of the plurality of mobile devices, receives an indication of a selection to have the altering performed.

9. The system of claim 8, wherein the receiving of the indication of the selection to have the altering performed occurs before the detecting of the plurality of mobile devices.

10. The system of claim 7, wherein the plurality of mobile devices are in motion at least during the detecting of the plurality of mobile devices.

11. The system of claim 10, wherein the motion of each of the plurality of mobile devices is in substantially the same direction as the motion of the others of the plurality of mobile devices.

12. The system of claim 7, wherein the altering of the functionality of the at least one of the plurality of mobile devices includes altering the functionality of the at least one of the plurality of mobile devices with respect to at least one of an operating system or a software application provision.

13. A computer program product for managing mobile devices by one or more processors, the computer program product comprising a non-transitory computer-readable storage medium having computer-readable program code portions stored therein, the computer-readable program code portions comprising:
  an executable portion that detects a plurality of mobile devices within a predetermined distance of each other for at least a predetermined duration; wherein the detecting is performed by each of the plurality of mobile devices within the predetermined distance of each other for at least the predetermined duration; and
  an executable portion that, after the detecting of the plurality of mobile devices, alters the functionality of at least one of the plurality of mobile devices based on data associated with another of the plurality of mobile devices; wherein the data associated with the other of the plurality of mobile devices includes data input into the other of the plurality of mobile devices through a user interface of the other of the plurality of mobile devices and information associated with a user of the other of the plurality of mobile devices.

14. The computer program product of claim 13, wherein the computer-readable program code portions further include an executable portion that, before the altering of the functionality of the at least one of the plurality of mobile devices, receives an indication of a selection to have the altering performed.

15. The computer program product of claim 14, wherein the receiving of the indication of the selection to have the altering performed occurs before the detecting of the plurality of mobile devices.

16. The computer program product of claim 13, wherein the plurality of mobile devices are in motion at least during the detecting of the plurality of mobile devices.

17. The computer program product of claim 16, wherein the motion of each of the plurality of mobile devices is in substantially the same direction as the motion of the others of the plurality of mobile devices.

18. The computer program product of claim 13, wherein the altering of the functionality of the at least one of the plurality of mobile devices includes altering the functionality of the at least one of the plurality of mobile devices with respect to at least one of an operating system or a software application provision.

* * * * *